(12) United States Patent
Theopold

(10) Patent No.: US 10,851,761 B2
(45) Date of Patent: Dec. 1, 2020

(54) WIND TURBINE PITCH CABINET TEMPERATURE CONTROL SYSTEM

(71) Applicant: KEBA Industrial Automation Germany GmbH, Lahnau (DE)

(72) Inventor: Tobias Theopold, Dortmund (DE)

(73) Assignee: KEBA INDUSTRIAL AUTOMATION GERMANY GMBH, Lahnau (DE)

( * ) Notice: Subject to any disclaimer, the term of this patent is extended or adjusted under 35 U.S.C. 154(b) by 566 days.

(21) Appl. No.: 15/387,290

(22) Filed: Dec. 21, 2016

(65) Prior Publication Data

US 2017/0184074 A1    Jun. 29, 2017

(30) Foreign Application Priority Data

Dec. 24, 2015  (GB) .................................. 1522886.9

(51) Int. Cl.
  *F03D 7/02*   (2006.01)
  *F03D 9/25*   (2016.01)
  *H02P 3/22*   (2006.01)

(52) U.S. Cl.
  CPC ......... *F03D 7/0244* (2013.01); *F03D 7/0224* (2013.01); *F03D 7/0272* (2013.01); *F03D 9/25* (2016.05); *H02P 3/22* (2013.01); *F05B 2260/42* (2013.01); *F05B 2270/107* (2013.01); *F05B 2270/303* (2013.01); *Y02E 10/723* (2013.01)

(58) Field of Classification Search
  CPC ...... F03D 7/0244; F03D 7/022; F03D 7/0248; F03D 7/042; F03D 7/0224; F03D 7/0272; F03D 7/00; F03D 7/024; F03D 7/0264; F03D 9/25; F03D 9/18; F03D 9/22; H02P 3/22; F05B 2260/42; F05B 2260/421; F05B 2270/107; F05B 2270/303; F05B 2270/3032; F05B 2270/32; F05B 2270/3201; F05B 2270/328; Y02E 10/723; Y02E 10/70; Y02E 10/72
See application file for complete search history.

(56) References Cited

U.S. PATENT DOCUMENTS

| | | | |
|---|---|---|---|
| 2012/0009066 A1 | 1/2012 | Vilbrandt et al. | |
| 2013/0020804 A1 | 1/2013 | Roesmann et al. | |
| 2013/0328539 A1* | 12/2013 | King ...................... | H02J 1/102 323/299 |
| 2013/0334818 A1 | 12/2013 | Mashal et al. | |
| 2014/0054892 A1* | 2/2014 | Brown .................. | F03D 7/0224 290/44 |
| 2014/0152201 A1* | 6/2014 | Shriver ................. | F03D 7/0252 318/376 |

FOREIGN PATENT DOCUMENTS

| | | |
|---|---|---|
| CN | 102356234 A | 2/2012 |
| CN | 203349482 U | 12/2013 |
| EP | 2080902 A2 | 7/2009 |
| WO | 2012134458 A1 | 10/2012 |

\* cited by examiner

*Primary Examiner* — Shawntina T Fuqua
(74) *Attorney, Agent, or Firm* — Leydig, Voit & Mayer, Ltd.

(57) ABSTRACT

A wind turbine temperature control system for maintaining the temperature of an energy storage device, the temperature control system has a breaking resistor for providing heat to the energy storage device and a power supply for causing a current to flow in the breaking resistor.

13 Claims, 2 Drawing Sheets

WIND TURBINE PITCH CABINET TEMPERATURE CONTROL SYSTEM

CROSS-REFERENCE TO PRIOR APPLICATION

Priority is claimed to British Patent Application No. GB 1522886.9 filed on Dec. 24, 2015.

FIELD

The invention relates to improvements in temperature control systems for an energy storage device and control circuitry. Particularly, but not exclusively, it relates to a temperature control system for maintaining the temperature of an emergency energy storage device and control circuitry used to power and control a pitch motor for emergency pitch control of a wind turbine rotor blade.

BACKGROUND

Wind turbines with rotor blades mounted on a rotor may use pivotable rotor blades for limiting the rotational speed of the rotor blades to prevent structural damage to the wind turbine when strong winds occur or to stop rotation at all. By angling the rotor blade into or out of the wind, the rotational torque experienced by the rotor blades is controlled, and the rotation speed and the generated power of the wind turbine can be adjusted and maintained within operational limits. It was common to use AC motors for so-called pitch drives of wind turbines for adjusting the angle of attack of each rotor blade. Nowadays there is a trend to DC motors and consequently intermediate circuits for DC frequency conversion are used for DC supply of the pitch drives. However, this comes with the need to control voltage when load feeds energy back to the intermediate circuit to avoid damage by overvoltage. Sometimes so-called braking choppers, also referred to as braking units, are used for this purpose. These braking choppers comprise a resistor, due to its function further herein called breaking resistor, for acting as an additional load for each DC motor.

In situations where it is critical that the rotor be stopped or have their speed otherwise limited, such as when the wind turbine is approaching overload or a structural safety threshold, it is critical that the pitch control mechanisms are functional at least for a time period that is necessary to turn all rotor blades into a so-called feathering position, where the rotor blades will bring the rotor to a halt. Accordingly, it has become standard practice to provide these pitch control mechanisms with emergency backup power supplies, such that the wind turbine can reduce rotor speed even in the event of a power loss or other failure.

An emergency power supply is often provided in the form of a capacitor.

Below a certain temperature, the internal resistance of the capacitors increases significantly. As a result, a proportion of the energy discharged by the capacitor in the event of an emergency would be wasted as heat. At best this represents an inefficiency in the backup power supply, at worst, the reduced output of the capacitor may not be enough to adequately alter the pitch of the rotor blades, eventually resulting damage to the wind turbine. As wind turbines are employed in a range of environments and climates, temperature control of the backup capacitors is a serious issue. A solution of the prior art was to discharge the emergency energy device in order to heat itself up by its own internal resistance.

Another solution of the prior art was to outfit wind turbines with heaters, commonly fan heaters, which operate to maintain key internal components at an optimum temperature. In addition to taking up space and adding weight, these traditional fan heaters are known to suffer from hysteresis when controlling temperature. Moreover, they rely on AC power. As many modern wind turbines use DC motors and DC intermediate frequency converter circuits, these traditional fans cannot be employed without costly and complicated modifications/additions to the design of the wind turbine. In order to meet electrical safety requirements, such modifications for using an AC heater include routing a neutral line through the pitch cabinet, causing additional costs.

Furthermore, by increasing the part count of the wind turbine, the cost and complexity of installation and maintenance are both increased.

SUMMARY OF THE INVENTION

In an embodiment, the present invention provides a wind turbine comprising a power supply, an energy storage device, an electric motor, control circuitry and a breaking resistor. The electric motor is in occasional electrical contact with the breaking resistor such that a first current flows through the breaking resistor and excess kinetic energy of the electric motor is converted into heat. The power supply is configured to cause a second current to flow through the breaking resistor such that the breaking resistor produces heat, and the breaking resistor is arranged relative to the control circuitry and the energy storage device such that the breaking resistor provides heat to the energy storage device and the control circuitry

BRIEF DESCRIPTION OF THE DRAWINGS

Embodiments of the present invention will now be described, by way of example only, with reference to the accompanying drawings, in which.

DETAILED DESCRIPTION

Figure 1:
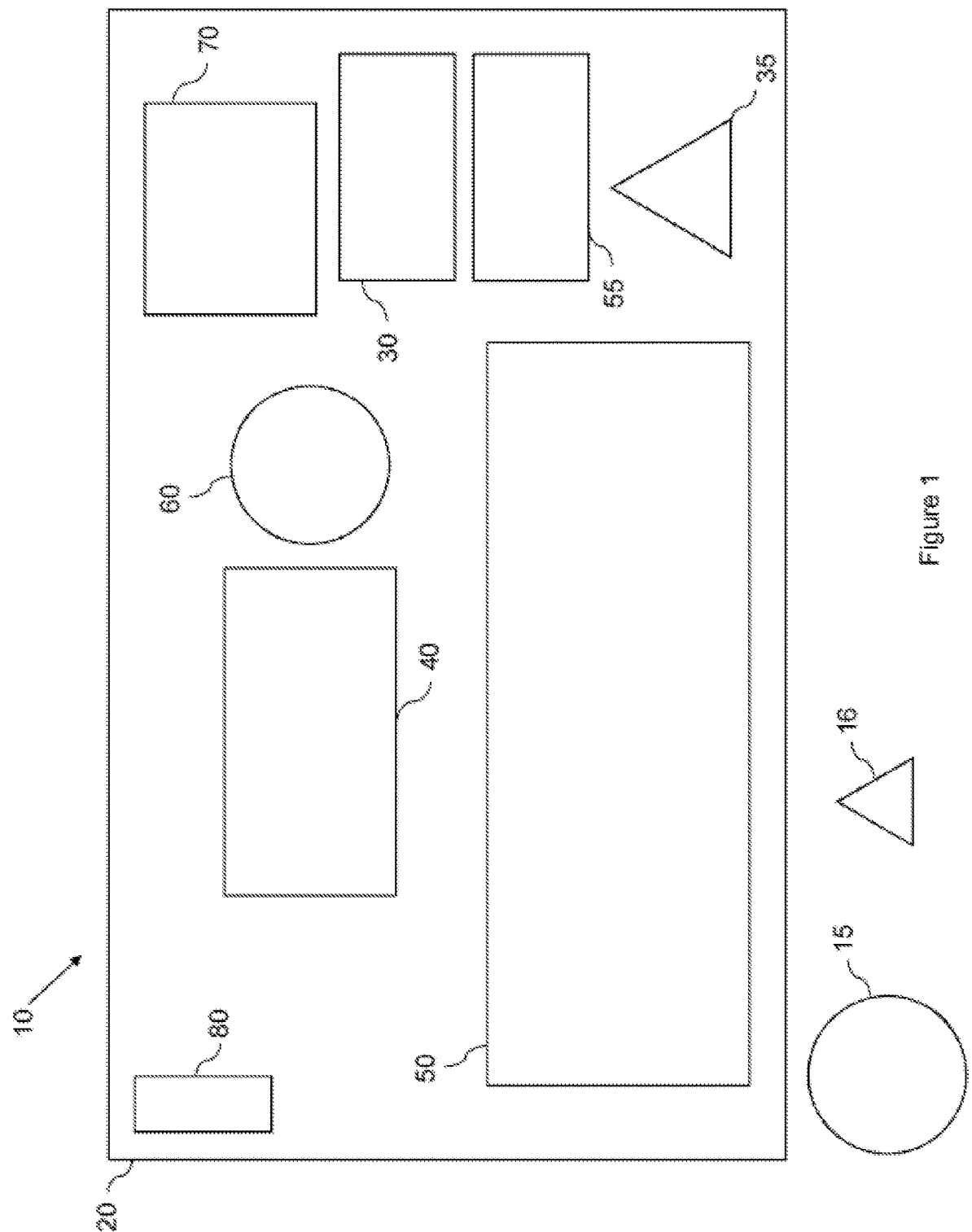
FIG. 1 is a schematic of a wind turbine in accordance with an embodiment of the invention.
Figure 2:
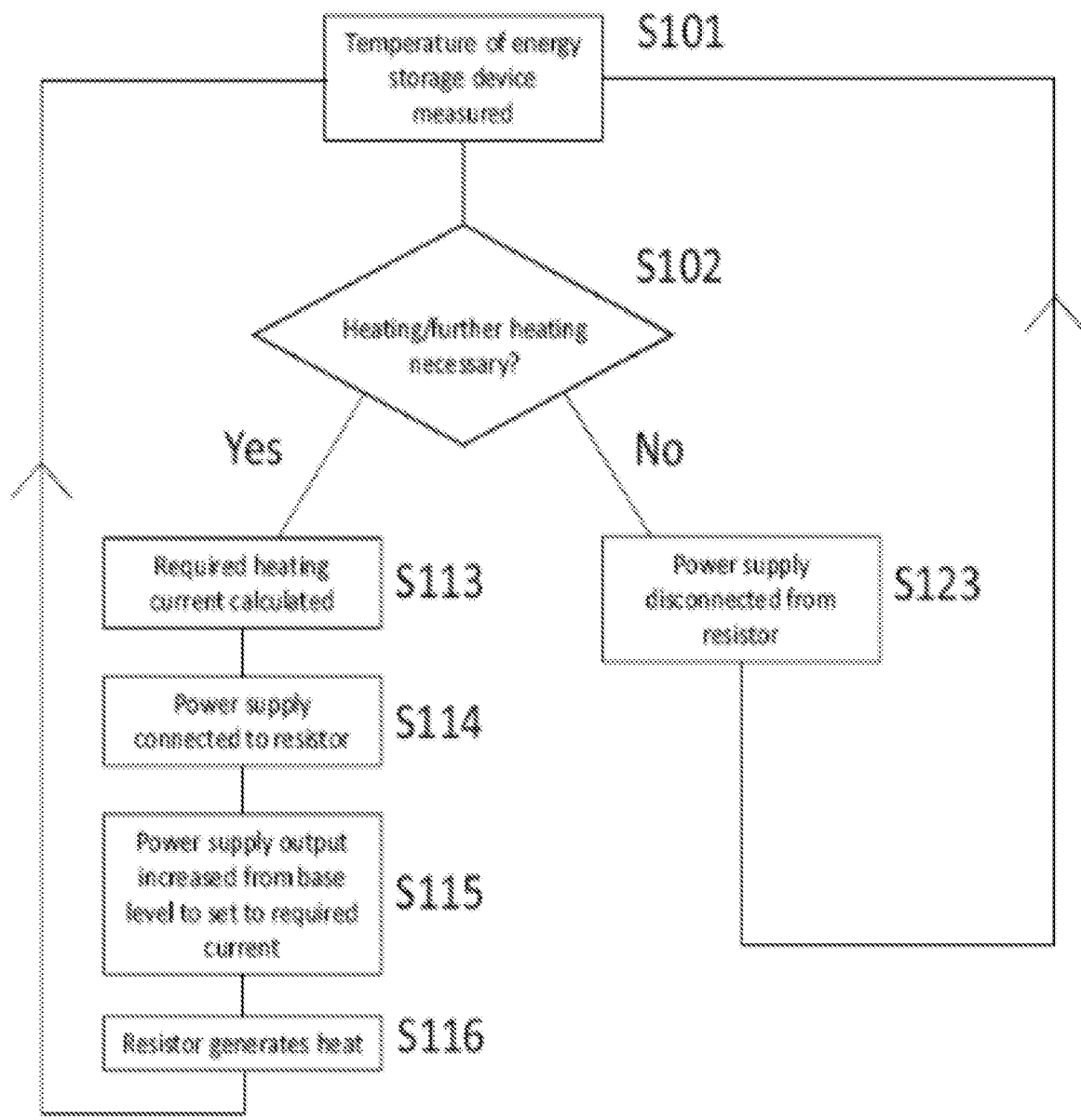
FIG. 2 is a flow chart of the method in accordance with an embodiment of the invention.

The ability to provide heat to the pitch control mechanism whilst minimising the need for additional components is desirable. As is the ability to provide heat for other components of the pitch control mechanism, such as the control circuitry.

In accordance with an embodiment of the present invention, there is provided a wind turbine comprising a power supply, an energy storage device, a generator and a breaking resistor, wherein the generator is in occasional electrical contact with the breaking resistor such that a first current flows through the breaking resistor and excess kinetic energy of the generator is converted into heat, and wherein the power supply is configured to cause a second current to flow through the breaking resistor such that the breaking resistor produces heat, and the breaking resistor and energy storage device are arranged such that breaking resistor provides heat to the energy storage device.

By providing a new mode of use of the breaking resistor as a source of heat for the energy storage device, the utility of the existing components of the wind turbine is optimised. The breaking resistor may also be used to maintain the temperature of other important components of the wind turbine. Moreover, the need for additional stand-alone heating elements is eliminated along with their associated disadvantages. Conventional AC powered fan heaters are known to suffer from hysteresis and require additional circuitry. By removing these elements, the overall part count of the wind turbine is reduced, saving space, weight and lowering the cost and complexity of installation and maintenance.

Preferably, the wind turbine further comprises control circuitry arranged relative to the breaking resistor such that the breaking resistor provides heat to the control circuitry. This helps prevent condensation from interfering with the operation of the control circuitry as well preventing other damage associated with low temperatures.

Preferably, the resistor, energy storage device and the control circuitry are housed in an enclosure. This helps to contain the heat output from the breaking resistor and defines the local thermal environment of the energy storage device and the control circuitry, allowing their temperature to be controlled more precisely. As above, all of the components are DC powered and there is no need to route a neutral line through the enclosure, as is the case for conventional AC powered fan heaters. Removing this constraint allows wiring efficiency of the wind turbine to be further maximised, as well as offering the advantages of fewer parts as discussed above. Further, locating the breaking resistor and the energy storage device in the same enclosure allows for easier access to both for maintenance, as well as saving space at the location where the breaking resistor may otherwise be installed, where space may be at a higher premium. Usually the breaking resistor in a wind turbine is located at a well-ventilated place to dissipate the heat produced by the breaking resistor as quickly as possible. The invention however, has realized that a breaking resistor is rarely used, so that when the properties of the selected breaking resistor are adequately chosen, the ventilation requirements become negligible.

Preferably, there is a fan configured to distribute airflow inside the enclosure. The fan may be powered by the same power supply that supplies the breaking resistor and increases heating efficiency by distributing heated air throughout the enclosure.

Preferably, there are switching means between the generator and the breaking resistor. This enables the breaking resistor to be switched into the intermediate AC converter circuit of the generator, drawing excess kinetic energy in the form of electrical current, and dissipating it as heat.

Preferably, there are switching means between the power supply and the breaking resistor. This enables the breaking resistor to be supplied with a current on demand, outputting heat used to regulate the temperature of the energy storage device and/or the control circuitry.

Preferably, the switching means are provided by one of a mechanical relay, solid state relay and thyristor.

Preferably, there is a processor in communication with the power supply, wherein the processor is configured to control the output of the power supply to the breaking resistor. The processor allows for fine control of the magnitude and timing of the current supplied to the breaking resistor. Accordingly, the temperature of the energy storage device and the control circuitry can be accurately maintained or altered according to commands from the processor.

Preferably, there is a temperature sensor in communication with the processor, wherein the temperature sensor is configured to monitor the temperature of at least one of the energy storage device, the enclosure and the control circuitry. This allows for the exact temperature of the different components to be monitored accurately. Together with the processor, this creates a feedback loop that modulates and calibrates the output of the power supply to the breaking resistor and the resulting change in temperature of the components.

Preferably, the energy storage device is a backup energy storage device of a pitch motor, configured to enable emergency pitch control of a wind turbine rotor blade.

Preferably, the energy storage device is a capacitor. Capacitors have a wide range of operational temperatures and can hold a change for long periods before substantial loss. Further, they be quickly and easily recharged by the power output of the wind turbine. This makes them a suitably reliable source of back-up power, especially for remote applications.

Preferably, the energy storage device is an ultracapacitor. Ultracapacitors have extremely wide range of operational temperatures spanning −40° C. to 60° C.

Preferably, the temperature of the energy storage device is maintained above −20° C. Above this temperature, the internal resistance of ulracapacitors is manageable and does not overly effect their output capability.

Alternatively, the energy storage device is maintained above −10° C. Above this temperature, substantially all of the energy stored in the ultracapacitor can be output, with minimal loss. This means that less energy is wasted by having to top up the charge of the capacitor, and the overall energy efficiency of the wind turbine increases.

Alternatively, the energy storage device is maintained above 0° C. Alternatively, the energy storage device is maintained within the range of 15° C. to 20° C.

In an embodiment, the present invention provides a wind turbine comprising a power supply, an energy storage device, a generator and a breaking resistor; wherein the generator is in occasional electrical contact with the breaking resistor such that a first current flows through the breaking resistor and excess kinetic energy of the generator is converted into heat, and; wherein the power supply is configured to cause a second current to flow through the breaking resistor such that the breaking resistor produces heat, and the breaking resistor and energy storage device are arranged such that breaking resistor provides heat to the energy storage device.

In an embodiment, the wind turbine further comprises control circuitry arranged relative to the breaking resistor such that the breaking resistor provides heat to the control circuitry.

In an embodiment, the breaking resistor and energy storage device are housed in an enclosure.

In an embodiment, the enclosure also houses control circuitry of the pitch drive.

In an embodiment, the wind turbine further comprises a fan configured to distribute airflow inside the enclosure.

In an embodiment, the wind turbine further comprises switching means between the power supply and the breaking resistor.

In an embodiment, the switching means are one of a mechanical relay, solid state relay and thyristor.

In an embodiment, the wind turbine further comprises a processor in communication with the power supply, wherein the processor is configured to control the output of the power supply to the breaking resistor.

In an embodiment, the wind turbine further comprises a temperature sensor in communication with the processor, wherein the temperature sensor is configured to monitor at least one of the temperature of the energy storage device, the enclosure, and the control circuitry.

In an embodiment, the energy storage device is a backup energy storage device of a pitch generator, configured to enable emergency pitch control of a wind turbine rotor blade.

In an embodiment, the energy storage device is a capacitor.

In an embodiment, the energy storage device is an ultracapacitor.

In an embodiment, the temperature of the energy storage device is maintained above −20° C.

In an embodiment, the temperature of the energy storage device is maintained above −10° C.

In another embodiment, the present invention provides a method for controlling the temperature of an energy storage device within a wind turbine, the method comprising: providing a wind turbine comprising a generator, a breaking resistor and an energy storage device, wherein the generator is in occasional electrical contact with the breaking resistor such that a first current can flow through the breaking resistor and convert excess kinetic energy of the generator into heat, and further providing a heating system comprising a power supply configured to cause a second current to flow through the breaking resistor, thereby producing heat, and arranging the breaking resistor and energy storage device such that the breaking resistor can provide this heat to the energy storage device.

In an embodiment, the method further comprises providing control circuitry and arranging the control circuitry relative to the breaking resistor such that the breaking resistor can provide heat to the control circuitry.

In an embodiment, the method further comprises supplying the breaking resistor with a current using the power supply, and providing heat from the breaking resistor to the energy storage device.

In an embodiment, the method further comprises providing heat from the breaking resistor to the control circuits.

In an embodiment, the method further comprises providing switching means between the generator and the breaking resistor.

In an embodiment, the switching means are one of a mechanical relay, solid state relay and thyristor.

In an embodiment, the method further comprises arranging at least the breaking resistor and energy storage device inside an enclosure.

In an embodiment, the method further comprises providing a fan, and distributing the airflow inside the enclosure.

In an embodiment, the method further comprises providing a processor in communication with the power supply, and controlling the output of the power supply by the processor.

In an embodiment, the method further comprises providing a temperature sensor in communication with the processor and in thermal contact with the energy storage device, measuring the temperature of the energy storage device using the temperature sensor, and controlling the output of the power supply in response to the measured temperature.

In an embodiment, the method further comprises providing a capacitor as the energy storage device.

In an embodiment, the method further comprises the steps of providing an ultracapacitor as the energy storage device.

In an embodiment, the method further comprises maintaining the temperature of the energy storage device above −20° C.

In an embodiment, the method further comprises maintaining the temperature of the energy storage device above −10° C.

In other embodiments, the present invention provides a wind turbine substantially as described herein with reference to the accompanying relevant figures.

In order to provide a wind turbine temperature control system capable of maintaining the temperature of an emergency energy storage device, whilst minimising the need for additional components, there is provided a wind turbine temperature control system in accordance with the present invention.

FIG. 1 shows a schematic of a wind turbine 10. The wind turbine 10 comprises at least a generator 15, a power supply 30, a breaking resistor 40, and an energy storage device 50.

The generator 15 is a conventional wind turbine generator and generates electricity in a known manner.

The power supply 30 is a known power supply. In a preferred embodiment, the power supply 30 is part of the central pitch control unit of the wind turbine. In a further embodiment, the power supply 30 is source of stored energy. In an alternative embodiment, the power supply 30 is battery. As such, any known suitable means for providing a current to the breaking resistor 40 can be employed. Such power supplies 30 are known in the art.

Both the generator 15 and the power supply 30 are configured to supply a current to the breaking resistor 40.

The breaking resistor 40 is configured to produce heat when supplied by a current. It would be apparent to the skilled person that within the context of the invention, that the term 'breaking resistor' is interchangeable with 'loading resistor', 'attenuation resistor', 'absorption resistor', and 'chopper resistor'.

The breaking resistor 40 can be switched into the intermediate converter circuit of the generator 15 to filter out surges or excess energy by converting electrical energy into heat. By imposing a greater resistive load on the generator 15, the breaking resistor 40 has the additional effect of slowing the generator 15 down. This technique is useful if the kinetic load on the wind turbine is suddenly reduced or is too small to keep the rotor speed within operational limits. In this way the wind turbine's 10 rotation can be kept at a safe speed in faster winds, while maintaining a nominal power output. In prior applications, the heat from a breaking resistor is a secondary, unwanted side-effect and is vented as waste heat to the environment via heat sinks.

The energy storage device 50 is a known emergency energy storage device. In an embodiment, the energy storage device 50 is a capacitor. In a preferred embodiment, the emergency energy storage device 50 is an ultracapacitor, with an optimum operational temperature of above −10° C. and a minimum operational temperature of −20° C. The emergency energy storage device 50 is arranged together with the breaking resistor 40 to enable efficient transfer of heat from the breaking resistor 40 to the emergency energy storage device 50. The breaking resistor 40 may be in thermal contact or physical contact with the emergency energy storage device 50, or both. In an embodiment, the emergency energy storage device 50 is abutting the breaking resistor 40. In a further embodiment, the emergency energy storage device 50 is in close proximity to the breaking resistor 40. In yet a further embodiment, the emergency energy storage device 50 is at least partially enveloped by the breaking resistor 40.

Optionally, the wind turbine further comprises control circuitry 55. The control circuitry 55 is arranged together with the breaking resistor 40 to enable efficient transfer of heat from the breaking resistor 40 to the control circuitry 55. The breaking resistor 40 may be in thermal contact or physical contact with the control circuitry 55, or both. In an embodiment, the control circuitry 55 is abutting the breaking resistor 40. In a further embodiment, the control circuitry 55 is in close proximity to the breaking resistor 40. In yet a further embodiment, the control circuitry 55 is at least partially enveloped by the breaking resistor 40.

Optionally, the breaking resistor 40 is electrically connected to the generator 15 by the switching means 16. In a preferred embodiment, the switching means 16 are a mechanically actuated relay. In a further embodiment, the switching means 16 are a solid state relay. In yet a further embodiment, the switching means 16 are a thyristor. As such, any known suitable means for enabling selective electrical connection of the breaking resistor 40 to the generator 15 can be employed. Such switching means 16 are known in the art.

Optionally, the wind turbine 10 comprises an enclosure 20. In a preferred embodiment the enclosure 20 houses the power supply 30, breaking resistor 40 and the emergency energy storage device 50 and control circuitry 55. In an embodiment, the enclosure 20 is thermally insulated. It would be apparent to the skilled person that within the context of the invention, that the enclosure 20 may be referred to as a 'pitch cabinet', 'pitch box', 'axis cabinet' or an 'axis box.'

Optionally, the breaking resistor 40 is electrically connected to the power supply 30 by the switching means 35. In an embodiment, the switching means 35 are housed within the enclosure 20. In an alternative embodiment, the switching means 35 are located outside of the enclosure 20. In a preferred embodiment, the switching means 35 are a mechanically actuated relay. In a further embodiment, the switching means 35 are a solid state relay. In yet a further embodiment, the switching means 35 are a thyristor. As such, any known suitable means for enabling selective electrical connection of the breaking resistor 40 to the power supply can be employed. Such switching means 35 are known in the art. In an alternative embodiment, the functionality of the switching means 35 and the switching means 16 is provided by single switching means.

Optionally, the wind turbine 10 comprises a fan 60. The fan 60 is housed in enclosure 20 and is arranged to circulate the air within enclosure 20. In an embodiment, the fan 60 is powered by power supply 30.

Optionally, the wind turbine 10 comprises a processor 70. In an embodiment, the processor 70 is housed within enclosure 20. In an alternative embodiment, the processor 70 is located outside of the enclosure 20. The processor 70 is configured to control the magnitude of the output of the power supply 30 to the breaking resistor 40. In an embodiment, the processor 70 is further configured to operate the switching means 35.

Optionally, the wind turbine 10 comprises a temperature sensor 80. The temperature sensor 80 is configured to measure the temperature of at least the emergency energy storage device 50, the enclosure 20 and the control circuitry 55 and provide this temperature data to the processor 70. In an embodiment, the temperature sensor 80 directly measures the temperature of emergency energy storage device 50. In an alternative embodiment, the temperature sensor 80 measures the temperature of the air within enclosure 20, providing an indirect measurement temperature of emergency energy storage device 50. The temperature sensor 80 measures continuously in one embodiment, and measures at intervals in another embodiment. The processor 70 is configured receive this temperature data and calculate the output of the power supply 30 to the breaking resistor 40 necessary to maintain the emergency energy storage device 50 and/or the control circuitry 55 at a set temperature. The processor 70 executes this calculation in a known manner. In an embodiment, the processor 70 is provided with a calibration between the output of the power supply 30 and the resulting change in temperature detected by the temperature sensor 80. In a further embodiment, this calibration may be dynamically determined by the processor in use. In an embodiment, the processor 70 employs a control loop feedback mechanism. In a preferred embodiment, the processor calculates the output of the power supply 30 to the breaking resistor 40 necessary to maintain the emergency energy storage device above −10° C. In a further embodiment, the processor calculates the output of the power supply 30 to the breaking resistor 40 necessary to maintain the emergency energy storage device above −20° C. Accordingly, the processor may maintain the emergency energy storage device at any particularly desired temperature or temperature range.

In use, the generator 15 of the wind turbine produces current in a known manner. In situations where this current is excessive, surplus to requirement, or when there is some other reason for the load on the generator to be increased, the breaking resistor 40 is connected into the generator 15 circuit by the switching means 16. In this way, the breaking resistor 40 absorbs energy from the generator and dissipates it as heat. Such situations are relatively rare however, typically occurring only once a week. Accordingly, the risk of the emergency energy storage device or any other components being overheated by the breaking resistor 40 is very low during normal operation of the wind turbine.

Independently of the state of switching means 16 and the connection between the generator 15 and the breaking resistor 40, at step S101 the temperature sensor 80 continuously measures the temperature of the emergency energy storage device 50 and provides the data to the processor 70.

At step S102 the processor 70 first determines if additional heat is needed to maintain the emergency energy storage device 50 above a desired temperature. If at step S102 the processor 70 determines that additional heat is needed, the process proceeds to step S113. If the processor 70 determines that no additional heat is needed, the process proceeds to step S123.

At step S113 the processor 70 calculates the magnitude of current to pass through the breaking resistor 40 and for how long this current needs to flow. This calculation is performed in a known manner.

At step S114 the processor 70 connects the power supply 30 to the breaking resistor 40 by operating the switching means 35, and sets the output of the power supply 30 to the required current at step S115. It will be apparent to one skilled in the art that these steps may be performed in any order or combined into a single step.

At step S116, this current passes through the breaking resistor 40, which produces heat through Ohmic heating. Hot air surrounding the breaking resistor is then distributed throughout the enclosure 20 by the fan 60, powered by power supply 30. The enclosure 20 helps to contain the heat output from the breaking resistor and defines the local thermal environment of the emergency energy storage device 50, allowing its temperature to be controlled more precisely. As all of the components are DC powered, there is no need to route a neutral line through the enclosure 20, as is the case for conventional wind turbines 10 that employ AC powered fan heaters. Removing this constraint allows wiring efficiency of the wind turbine 10 to be further maximised, as well as offering the advantages of fewer parts as discussed above. Further, locating the breaking resistor 40 and the emergency energy storage device 50 in the same enclosure 20 allows for easier access to both for maintenance, as well as saving space at the location where the breaking resistor 40 may otherwise be installed, where space may be at a higher premium.

Heat is therefore provided to the emergency energy storage device 50. By providing this secondary mode of use of the breaking resistor 40 as a source of heat for the emergency energy storage device 50, the utility of the existing components of the wind turbine 10 is optimised. Moreover, this eliminates the need for additional stand-alone heating elements along with their associated disadvantages. Conventional AC powered fan heaters are known to suffer from hysteresis and require additional circuitry. By removing these elements, the overall part count of the wind turbine 10 is reduced, saving space, weight and lowering the cost and complexity of installation and maintenance.

The sequence of steps is then reset to step S101, where the temperature sensor 80 continues to measure the temperature of emergency energy storage device 50 and the process is restarted.

At step S123, following the decision at step S102 that no heating is needed, processor 70 disconnects the breaking resistor 40 from the power supply 30 by operating the switching means 35.

At step S124 the processor 70 reduces the output of the power supply 30. It will be appreciated by one skilled in the art that the power supply 30 may set to an 'off' state or an 'idle' state. In an embodiment the power supply 30 may be used to provide power for the fan 60, and will therefore continue to output some base level of power. In this way, the processor 70 allows for fine control of the magnitude and timing of the current supplied to the breaking resistor 40. Accordingly, the temperature of the emergency energy storage device 50 can be accurately maintained or altered according to commands from the processor 70.

Therefore, there is provided a wind turbine 10 comprising a power supply 30, an emergency energy storage device 50, a generator 15 and a breaking resistor 40, wherein the generator 15 is in occasional electrical contact with the breaking resistor 40 such that a first current flows through the breaking resistor 40 and excess kinetic energy of the generator 15 is converted into heat, and wherein the power supply 30 is configured to cause a second current to flow through the breaking resistor 40 such that the breaking resistor 40 produces heat, and the breaking resistor 40 and emergency energy storage device 50 are arranged such that breaking resistor 40 provides heat to the emergency energy storage device 50.

The invention claimed is:

1. A wind turbine comprising a power supply, an energy storage device, an electric motor, control circuitry and a breaking resistor;
    wherein the electric motor is in occasional electrical contact with the breaking resistor such that a first current flows through the breaking resistor and excess kinetic energy of the electric motor is converted into heat; and
    wherein the power supply is configured to cause a second current to flow through the breaking resistor such that the breaking resistor produces heat, and the breaking resistor is arranged relative to the control circuitry and the energy storage device such that the breaking resistor provides heat to the energy storage device and the control circuitry.

2. A wind turbine comprising a power supply, an energy storage device, an electric motor and a breaking resistor;
    wherein the electric motor is in occasional electrical contact with the breaking resistor such that a first current flows through the breaking resistor and excess kinetic energy of the electric motor is converted into heat;
    wherein the power supply is configured to cause a second current to flow through the breaking resistor such that the breaking resistor produces heat, and the breaking resistor and the energy storage device are arranged such that the breaking resistor provides heat to the energy storage device; and
    wherein the breaking resistor and energy storage device are housed in an enclosure.

3. The wind turbine of claim 2, wherein the enclosure also houses control circuitry of the pitch drive.

4. The wind turbine of claim 2 further comprising a fan configured to distribute airflow inside the enclosure.

5. The wind turbine of claim 1 further comprising switching means between the power supply and the breaking resistor.

6. The wind turbine of claim 2 further comprising a processor in communication with the power supply, wherein the processor is configured to control the output of the power supply to the breaking resistor.

7. The wind turbine of claim 6 further comprising a temperature sensor in communication with the processor, wherein the temperature sensor is configured to monitor at least one of the temperatures of the energy storage device, the enclosure, and the control circuitry.

8. The wind turbine of claim 1 wherein the energy storage device is a backup energy storage device of a pitch electric motor, configured to enable emergency pitch control of a wind turbine rotor blade.

9. The wind turbine of claim 1 wherein the energy storage device is a capacitor.

10. The wind turbine of claim 9 wherein the energy storage device is an ultracapacitor.

11. A method for controlling the temperature of an energy storage device within a wind turbine, the method comprising;
    providing a wind turbine comprising an electric motor, a breaking resistor, control circuitry and an energy storage device,
    wherein the electric motor is in occasional electrical contact with the breaking resistor such that a first current can flow through the breaking resistor and convert excess kinetic energy of the electric motor into heat, and
    further providing a heating system comprising a power supply configured to cause a second current to flow through the breaking resistor, thereby producing heat, and arranging the breaking resistor, control circuitry and energy storage device relative to each other such that the breaking resistor can provide this heat to the energy storage device and the control circuitry.

12. The method of claim 11 further comprising;
    supplying the breaking resistor with a current using the power supply, and
    providing heat from the breaking resistor to the energy storage device.

13. The method of claim 12 further comprising providing heat from the breaking resistor to the control circuitry.

* * * * *